United States Patent
Bakshi et al.

(10) Patent No.: US 8,385,824 B2
(45) Date of Patent: Feb. 26, 2013

(54) PROCEDURE FOR HEADSET AND DEVICE AUTHENTICATION

(75) Inventors: Anindya Bakshi, Dhanbad District (IN); Raghunath Govindachari, Bangalore (IN)

(73) Assignee: MindTree Limited, Bangalore (IN)

( * ) Notice: Subject to any disclaimer, the term of this patent is extended or adjusted under 35 U.S.C. 154(b) by 984 days.

(21) Appl. No.: 12/011,499

(22) Filed: Jan. 28, 2008

(65) Prior Publication Data

US 2008/0274696 A1  Nov. 6, 2008

(30) Foreign Application Priority Data

May 3, 2007  (IN) .............................. 947/CHE/2007

(51) Int. Cl.
*H04B 7/00* (2006.01)
(52) U.S. Cl. ...... 455/41.2; 455/41.1; 455/410; 455/507; 455/518; 455/343.1; 455/344; 455/466; 455/414.1; 455/414.2; 455/575.2
(58) Field of Classification Search ........ 455/41.1–41.2, 455/410, 507, 518, 343.1, 344, 466, 414.1–414.2
See application file for complete search history.

(56) References Cited

U.S. PATENT DOCUMENTS

| | | | | |
|---|---|---|---|---|
| 7,149,551 | B2 | 12/2006 | Kim | 455/569.1 |
| 7,376,778 | B2 * | 5/2008 | Sinai | 710/312 |
| 2002/0111140 | A1 | 8/2002 | Kim | 455/41.2 |
| 2003/0003892 | A1 | 1/2003 | Makinen | 455/345 |
| 2003/0044654 | A1 * | 3/2003 | Holt | 429/13 |
| 2005/0015618 | A1 | 1/2005 | Schneider | 726/4 |
| 2005/0135573 | A1 | 6/2005 | Harwood | 379/88.03 |
| 2006/0098812 | A1 | 5/2006 | Pedersen | 379/431 |
| 2006/0135065 | A1 * | 6/2006 | Lee et al. | 455/41.1 |
| 2006/0178160 | A1 * | 8/2006 | Hans et al. | 455/518 |
| 2006/0203083 | A1 * | 9/2006 | Wilson et al. | 348/14.02 |
| 2007/0178874 | A1 * | 8/2007 | Matsuyama | 455/343.1 |
| 2007/0287418 | A1 * | 12/2007 | Reddy | 455/410 |

* cited by examiner

*Primary Examiner* — Edward Urban
*Assistant Examiner* — Ganiyu A Hanidu
(74) *Attorney, Agent, or Firm* — Ash Tankha; Lipton, Weinberger & Husick

(57) ABSTRACT

Disclosed herein is a system for configuring and setting up a one to one communication correspondence between a headset and a mobile device. The authentication PIN allows communication of the headset with only those devices that are authenticated using the PIN. A first software application and a second software application are provided on the mobile device and a headset respectively. The process of configuring the PIN access information on the headset using the first and second application comprises the step of establishing a secure communication link by completing challenge response sequence between the headset and the device using the currently prevailing PIN, transmitting a configuration set PIN from the device to the headset, enforcing reauthentication using the newly configured PIN, and establishing and locking a communication between the device and the headset based on the new personal identification number.

16 Claims, 4 Drawing Sheets

PROCEDURE FOR HEADSET AND DEVICE AUTHENTICATION

BACKGROUND

This invention in general relates to wireless communications and specifically relates to a method and system for establishing a one to one secure communication correspondence between a mobile device and a Bluetooth headset.

Bluetooth™ is an industrial specification standard for wireless communications in a personal area network. Bluetooth standard enables communication between devices such as laptops, mobile phones, Bluetooth enabled headsets, digital cameras, etc., using short range radio frequency.

For reasons of security, authentication is required prior to connecting a Bluetooth enabled mobile device to a Bluetooth headset. A personal identification number (PIN) may be used for establishing a secure communication correspondence between the headset and the mobile device. For example, today the commercially available Bluetooth headsets are assigned fixed PINs during manufacture. The communicating mobile devices typically employ such fixed PINs to establish a secure communication with the headsets. Bluetooth security is based on the generation of security keys using a PIN code. In most Bluetooth devices, "0000" is a commonly assigned PIN by the manufacturer of the Bluetooth device.

If an attacker can discover a Bluetooth device, the attacker may be able to send unsolicited messages or abuse the Bluetooth service. An attacker may be able to find a way to access or corrupt the data. One example of this type of activity is "bluesnarfing". Bluesnarfing refers to attackers using a Bluetooth connection to steal information from a Bluetooth device. Also, viruses and other malicious codes can take advantage of Bluetooth technology to infect other devices. If the Bluetooth device is infected, the data may be corrupted, compromised, stolen, or lost.

Many Bluetooth headset related security issues arise due to the well known fixed PIN associated with the Bluetooth headset. Ideally, the manufacturers of Bluetooth headsets would prefer to have different PINs assigned to different headsets during manufacturing. However, it is not efficient from a manufacturing and assembly perspective to provide a unique PIN to each device. Providing an additional human machine interface on the headsets to configure the PIN may also not be a cost effective solution.

Therefore, there is a need for a method and system that is capable of establishing a one to one secure communication correspondence between a mobile device and a Bluetooth headset that enables device specific PINs.

SUMMARY OF THE INVENTION

The method and system disclosed herein addresses the above challenges of PIN based security in Bluetooth communication between a human-machine interface (HMI) capable Bluetooth device such as a mobile handset and a device without HMI such as a Bluetooth headset.

Disclosed herein is a method and system for configuring and setting up a one to one communication correspondence between a Bluetooth headset and a Bluetooth mobile device. A challenge-response sequence, using an authentication PIN, is initiated between the headset and the mobile device for authentication purposes. After a successful challenge-response sequence, the mobile device is allowed to communicate with the headset, thereby allowing a secure communication channel to exist between the mobile device and the headset.

Headsets may not be provided with a human-machine interface (HMI) capability required to change the PIN. The method and system disclosed herein allows a user to change the headset PIN using the Bluetooth connectivity between the headset and the mobile device, wherein a mobile device can be seen as an extended HMI of the headset. The invention allows a Bluetooth headset user to change the default PIN associated with the Bluetooth headset, thereby reducing the security risk associated with the usage of Bluetooth headsets.

The process of configuring the PIN associated with the headset comprises the step of transmitting a configuration set PIN from the mobile device to the headset. The configuration set PIN is transmitted via Bluetooth wireless communication.

When provided with a new headset, the user would first need to establish a secure connection with the mobile device. Once a connection is established, the user may be prompted either by the mobile device or the headset to reset the PIN code. The operation sequence can be the same as resetting an account password; such as first, asking for the old password, if matched, prompting for a new password and then reconfirming the password entry.

In another embodiment of the invention, other configuration parameters of the headset besides the PIN such as audio gain setting may also be securely configured or altered.

BRIEF DESCRIPTION OF THE DRAWINGS

The foregoing summary, as well as the following detailed description of the embodiments, is better understood when read in conjunction with the appended drawings. For the purpose of illustrating the invention, there is shown in the drawings exemplary constructions of the invention; however, the invention is not limited to the specific methods and instrumentalities disclosed.

DETAILED DESCRIPTION OF THE DRAWINGS

Figure 1:
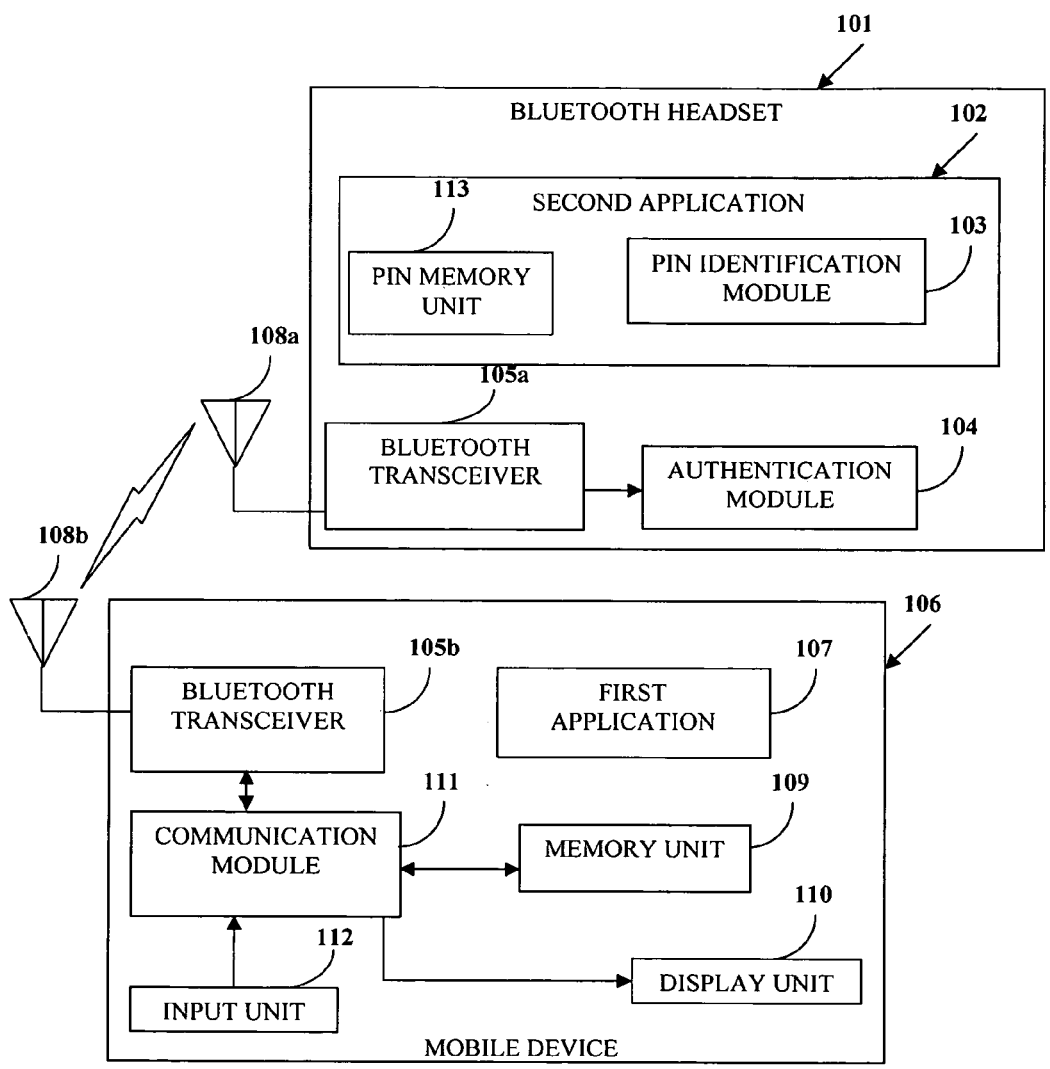
FIG. 1 exemplarily illustrates the system for establishing an authentication PIN on the Bluetooth headset.

FIG. 1 illustrates an exemplary system for establishing an authentication PIN on the Bluetooth headset 101. A Bluetooth headset 101 is in a wireless communication with a Bluetooth enabled mobile device 106. The mobile device 106 can use the Bluetooth connectivity to configure various parameters of the Bluetooth headset 101 by acting as an extended HMI of the Bluetooth headset 101. The mobile device 106 comprises a first application 107, which further comprises a first personal identification number configuration module. The antennae 108a and 108b are capable of receiving and transmitting short range radio frequency waves. A Bluetooth transceiver 105b located on the mobile device 106 is configured to decode and encode the radio signals, received and transmitted. The first application 107 of the mobile device 106 performs the identification and authentication procedures concerning the mobile device 106. A communication module 111 establishes an authenticated communication channel, locks the communication channel for the entire duration of the connection, warns the user if the headset 101 moves out of the coverage range of the mobile device 106, and disconnects an existing connection after the lapse of the duration or as instructed by the user. A memory unit 109 associated with the mobile device 106 stores all relevant information associated with the mobile device 106. A display unit 110 and an input unit 112 of the mobile device 106 act as HMI of the mobile device 106. The display unit 110 may be one of a liquid crystal display (LCD), a touch screen, etc. The input unit 112 may be one of a keypad, voice recognition unit, touch screen, etc.

The Bluetooth headset 101 comprises a second application 102 that performs the identification and authentication procedures for the Bluetooth headset 101. The second application 102 provided on the headset 101 comprises a second personal identification number configuration module and a PIN identification module 103. The second application 102 further comprises a personal identification number storage means that stores permitted personal identification numbers. The personal identification number storage means contains a PIN memory unit 113 and a memory access means. The mobile device 106 comprises a memory unit 109 that can be accessed by the memory access means of the second application 102 on the headset 101.

The Bluetooth headset 101 further comprises a Bluetooth transceiver 105*a* coupled to an antenna 108*a*, functionally similar to the Bluetooth transceiver 105*b* and antenna 108*b* of the mobile device 106. The Bluetooth transceiver 105*a* receives Bluetooth packets from a mobile device 106 in the vicinity of the headset 101. The PIN identification module 103 recognizes the currently prevailing PIN of the mobile device 106 requesting connectivity with the headset 101. The PIN identification module 103 further may use the currently prevailing PIN of the mobile device 106 during a challenge-response sequence to establish a secure connection.

The PIN memory unit 113 may further comprise a PIN database. A new configuration set PIN inputted by the user is transmitted from the mobile device 106 to the headset 101. After the new configuration set PIN is accepted by the headset 101, an authentication module 104 enforces reauthentication using the new configuration set PIN. After reauthentication, the new configuration set PIN is stored as one of the permitted PINs in the PIN database of the Bluetooth headset 101.

The PIN memory unit 113 of the Bluetooth headset 101 comprises the PIN access information such as a list of all the permitted PINs, user profiles, Bluetooth headset information, details of the users permitted to change the personal identification number, etc.

In one embodiment, the PIN access information resides locally in the PIN memory unit 113 of the Bluetooth headset 101. In another embodiment, the PIN access information may be stored in the mobile device's memory unit 109, thereby acting as an extended external memory of the Bluetooth headset 101.

Figure 2:
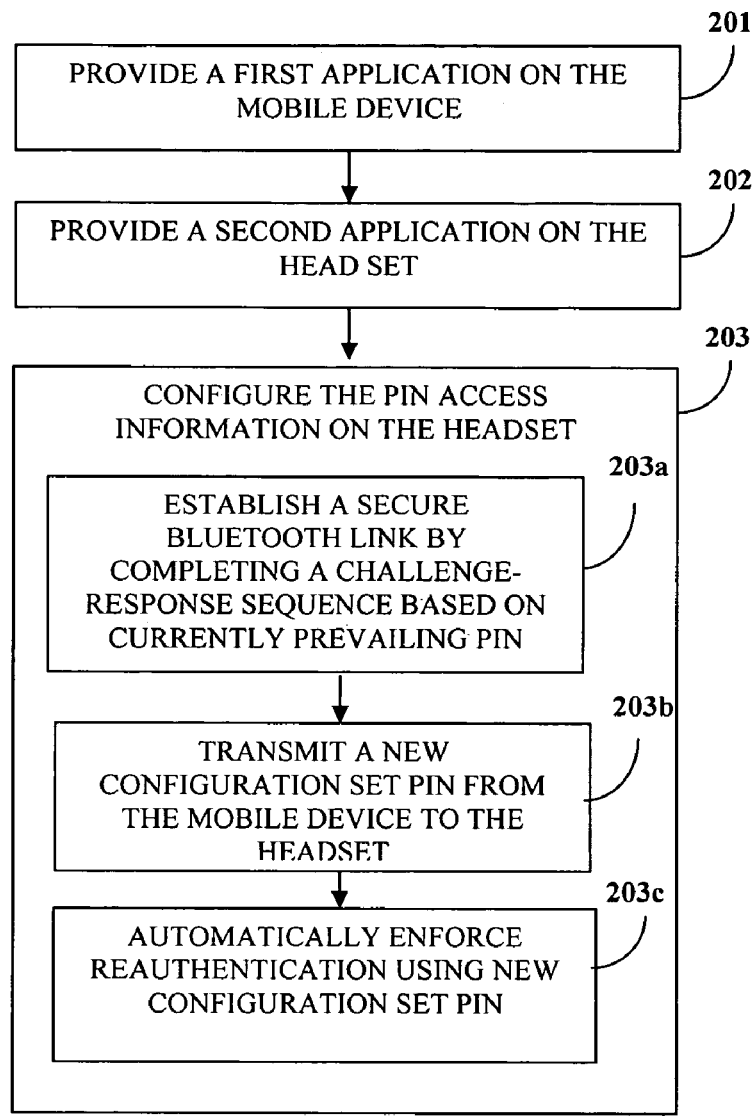
FIG. 2 exemplarily illustrates the method of establishing an authentication PIN on the Bluetooth headset.

FIG. 2 exemplarily illustrates a method of establishing an authentication PIN on the Bluetooth headset 101 for a secured Bluetooth communication between the Bluetooth headset 101 and the mobile device 106. A first application 107 provided 201 on the mobile device 106 and a second application 102 provided 202 on the Bluetooth headset 101 are used in the PIN identification and authentication procedures. The PIN access information is configured 203 on the headset 101. The PIN access information comprises a list of all the permitted PINs, the details of the currently prevailing PIN, such as the timestamp of PIN setting, change history of the currently prevailing PIN, etc. The step of configuring PIN access information 203 involves first establishing a secure Bluetooth link between the mobile device 106 and the headset 101 by completing a challenge response sequence using the currently prevailing PIN 203*a*. Once a secure communication link is successfully established, and upon being triggered either by user action on the mobile device 106 or an autonomous request from the headset 101, a new configuration set PIN 203*b* is transmitted, using the first personal identification number configuration module, from the mobile device 106 to the Bluetooth headset 101. The autonomous request from the headset 101 may be generated based on a pre-set timeout on how long the currently prevailing PIN has been in use. The new configuration set PIN from the mobile device 106 is stored as a permitted personal identification number in the PIN database of the PIN memory unit 113. After configuring the PIN access information, as a final step towards committing the newly configured PIN, a one to one communication correspondence between the Bluetooth headset 101 and the mobile device 106 is created using the new configuration set PIN.

The step of creating a one to one-communication correspondence comprises automatically enforcing reauthentication using the new configuration set PIN 203*c*. A communication between the mobile device 106 and the Bluetooth headset 101 is established and the communication is locked using the new configuration set PIN. If the attempt to establish communication using the new configuration set PIN is not successful, then the headset 101 will revert to the older PIN, or a default PIN.

Figure 3:
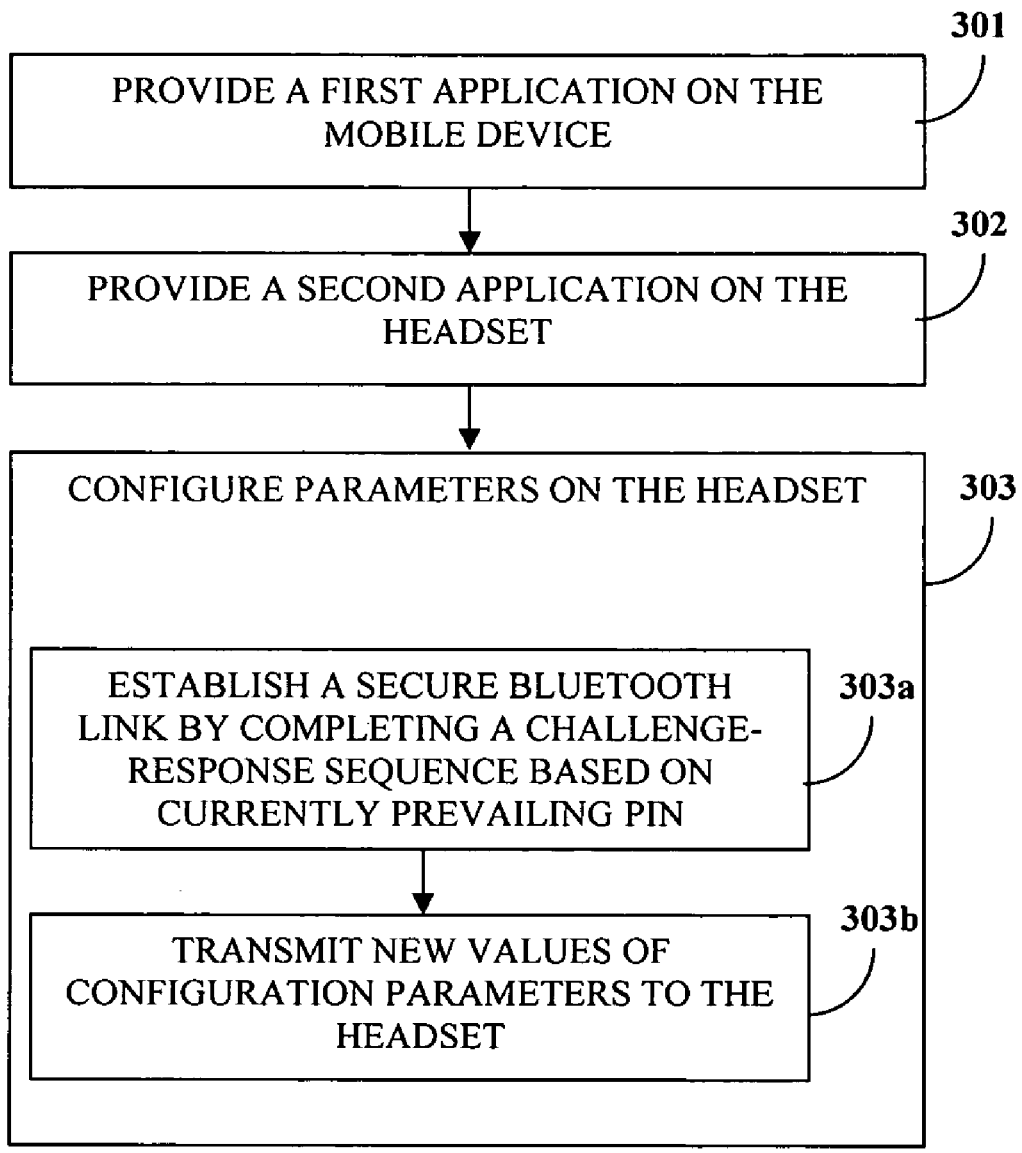
FIG. 3 exemplarily illustrates the method of configuring parameters of the Bluetooth headset.

FIG. 3 exemplarily illustrates the method of configuring-parameters of the Bluetooth headset 101. An example of a configuration parameter is the audio volume settings in the headset 101. A first application 107 provided 301 on the mobile device 106 and a second application 102 provided 302 on the Bluetooth headset 101 are used for configuring parameters on the headset 101. The step of configuring parameters 303 on the headset 101 involves first establishing a secure Bluetooth link between the mobile device 106 and the headset 101 by completing a challenge response sequence using the currently prevailing PIN 303*a*. A one to one communication correspondence is created between the mobile device 106 and the Bluetooth headset 101 after a successful challenge response sequence. The Bluetooth headset 101 then verifies if the transmitted request for altering a configuration parameter is authorized. The new value of the configuration parameter is transmitted 303*b* to the headset 101. If the request for altering the configuration parameter is authorized, the change in the configuration parameter of the Bluetooth headset 101 is permitted and applied. After applying the change in the configuration parameter of the Bluetooth headset 101, the Bluetooth headset 101 may transmit a confirmation message to the mobile device 106, confirming the change in the configuration parameter. If a change in the configuration parameter to a value not supported by the Bluetooth headset 101 is requested, the Bluetooth headset 101 may transmit an error message to the mobile device 106.

Figure 4:
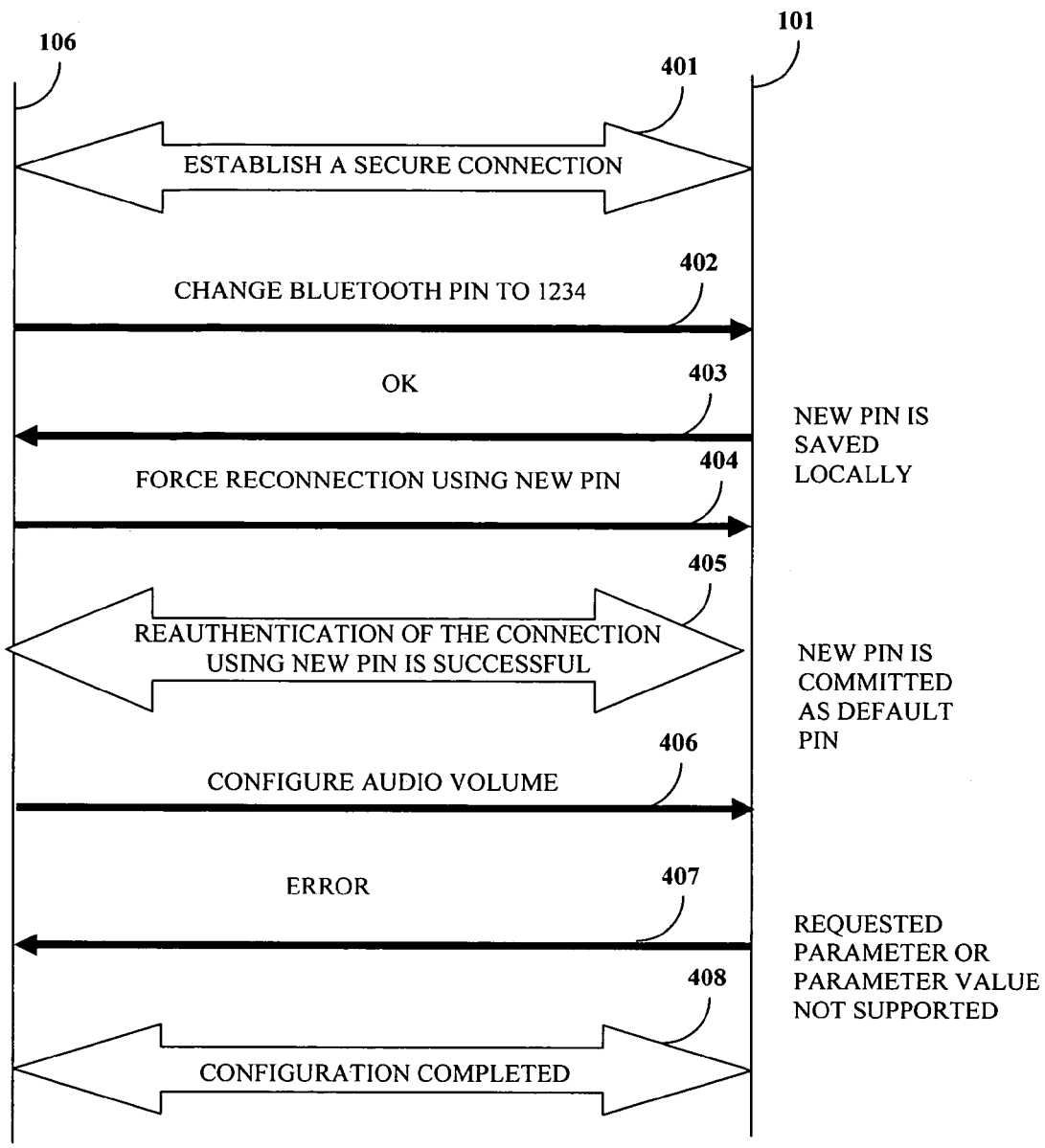
FIG. 4 exemplarily illustrates a message sequence chart for configuring the PIN and the audio settings of the Bluetooth headset.

FIG. 4 exemplarily illustrates a message sequence chart for configuring PIN and the audio settings of the Bluetooth headset 101. Specifically, FIG. 4 illustrates a message sequence chart that exemplifies a successful change of PIN and an unsuccessful change of audio volume settings of the headset 101. In FIG. 4, the left-most vertical line represents the mobile device 106 and the right-most vertical line represents the Bluetooth headset 101. Once an authenticated communication is established 401 between the mobile device 106 and the Bluetooth headset 101 through a challenge-response sequence, the authorized user is allowed to change any configuration parameter including the authentication PIN of the Bluetooth headset 101. For example, the user may initiate a request to change the currently prevailing PIN to 1234 402 from the mobile device 106 to the Bluetooth headset 101. In return the Bluetooth headset 101 first verifies whether the request is authorized and receives the request to change the PIN. The verification procedure may involve the step of prompting the user for the currently prevailing PIN or the default PIN provided by the manufacturer. The currently prevailing PIN may be replaced with the requested PIN and a confirmation message may be transmitted back 403 to the mobile device 106 after the headset 101 saves the new PIN. Then, the headset 101 using the authentication module 104 forces the reauthentication of the connection using the newly assigned PIN 404. If the reauthentication is successful 405, the headset 101 commits the new PIN as the default or prevailing PIN. The authorized user is allowed to change configuration settings of other parameters of the Bluetooth headset 101 to customize the Bluetooth headset 101 to the user's requirement. For example, the user may request to configure the audio volume of the Bluetooth headset 101. The request message is transmitted 406 from the mobile device 106 to the Bluetooth headset 101. After repeating the verification procedure, the Bluetooth headset 101 receives the request to change the audio volume settings. The Bluetooth headset 101 determines whether or not the audio volume parameter is supported. If the requested audio volume value is within the acceptable range of the headset 101, the change in the audio volume is accepted and a confirmation message is transmitted to the mobile device 106. If the value is outside the acceptable limit, the Bluetooth headset 101 may deny the request and transmit an error message 407 to the mobile device 106. After the completion of the procedure, both the Bluetooth headset 101 and the mobile device 106 mutually concur and complete the configuration 408.

In an embodiment of the invention, the authentication PIN used to access the Bluetooth headset 101 may be common to a plurality of mobile devices 106. In another embodiment the authentication PIN may be unique to a mobile device 106. An authorized user may set or change the currently prevailing PIN common to a plurality of mobile devices. In case of such authentication PIN changes, the details of the PIN change are notified to other authorized users who share the common authentication PIN for accessing the Bluetooth headset 101. A notification message regarding the PIN change may be transmitted when the Bluetooth headset 101 falls within the coverage range of the other authorized mobile devices sharing the common authentication PIN.

When the headset 101 enters the coverage range of an unauthorized device, and a challenge-response sequence with the headset 101 is unsuccessful, the unauthorized device prompts the user to enter the authentication personal identification number for authenticating access to the headset 101. Authorized users requesting subsequent access to the headset 101 may be automatically connected to the headset 101 through challenge response sequences.

In an embodiment of the invention, the headset 101 may be provisioned with multiple PINs for different devices and can be used to service a call using any of the associated mobile devices. Providing multiple PINs on a headset 101 may be useful when a user wants to share the single headset 101 for multiple audio gateways such as a mobile phone, a car phone or a desktop phone.

In yet another embodiment of the invention, the headset device 101 may be provisioned with multiple PINs for a single mobile device 106. Allocation of multiple PINs for a single mobile device 106 may be useful when multiple users of the single mobile device 106 need independent secure connections to a common headset 101. PINs of independent users of the mobile device 106 may be associated with the respective users' profiles. When a particular user attempts to access the headset 101 with the current user's profile, the headset 101 automatically uses the PIN associated with the current user's profile to establish the connection. The profiles of the users may be present either in the headset's memory or in the memory unit 109 of the mobile device 106. The user's profile in the memory unit 109 of the mobile device 106 may be accessed through the memory access means of the headset 101, where the memory unit 109 behaves as an extended external memory of the Bluetooth headset 101.

In one embodiment of the invention, an inactivity timer may be used to dissociate the headset 101 from a mobile device 106 that is inactive for a long period. The sleep time of a mobile device 106 may be configured in the inactivity timer. The headset 101 may automatically disconnect the paired communication channel with the mobile device 106 that is inactive for a period longer than the configured sleep time. The sleep time may be preconfigured or configured during registration of the mobile device 106 with the headset 101.

The method and system of the present invention has been described in the context of Bluetooth wireless communication medium, although any wireless communication medium such as microwave, infrared (IR), etc., may be employed for implementing the present invention.

The present invention is configured to work in a Bluetooth based communication network environment, however it can be appreciated by those skilled in the art that it can also be applied to work between any two devices that require PIN based authentication for setting up a secure channel and communicate via wireless or wired means.

It will be readily apparent that the various methods and algorithms described herein may be implemented in a computer readable medium, e.g., appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hardwired circuitry or custom hardware may be used in place of, or in combination with, software instructions for implementation of the processes of various embodiments. Thus, embodiments are not limited to any specific combination of hardware and software. A "processor" means any one or more microprocessors, Central Processing Unit (CPU) devices, computing devices, microcontrollers, digital signal processors, or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

Where databases are described, such as the PIN database, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A method of configuring an authentication personal identification number on a headset, comprising:
   providing a first application on a device configured with a human machine interface;
   providing a second application on the headset;
   configuring a personal identification number access information on said headset using said first application and said second application, comprising:
      establishing a secure communication link by completing challenge response interaction sequences between the headset and the device, using a currently prevailing personal identification number;
      generating an autonomous request from the headset to configure a new authentication personal identification number based on a pre-set timeout for said currently prevailing personal identification number;
      generating a new authentication personal identification number at the device based on one of a user input at the device and a user selection from a list of permitted personal identification numbers stored in the device;
      transmitting said new authentication personal identification number from said device to said headset for configuring the new authentication personal identification number in the headset, whereby said human machine interface of said device acts as an extended human machine interface of the headset, wherein said transmission occurs through said established secure communication link; and
      automatically enforcing reauthentication using said new authentication personal identification number;
   whereby said reauthentication using said new authentication personal identification number enables audio communication between said headset and said device.

2. The method of claim 1, further comprising a step of establishing and locking a communication link between the device and the headset, wherein said communication link is established using a new authentication personal identification number.

3. The method of claim 1, wherein said personal identification number access information can be configured multiple times.

4. The method of claim 1, wherein when said headset enters the coverage range of an unauthorized device, and a challenge response sequence with the headset is unsuccessful, the unauthorized device prompts a user of the unauthorized device to enter the authentication personal identification number for authenticating access to the headset.

5. The method of claim 1, wherein when said headset enters the coverage range of an authorized device, said authorized device is automatically authenticated to access the headset.

6. The method of claim 1, wherein more than one personal identification number is associated with the headset.

7. The method of claim 1, wherein said authentication personal identification number is specific to a remote device, wherein said remote device uses said specific authentication personal identification number to gain access to the headset.

8. A method of altering a plurality of configuration parameters of a headset using a human machine interface of a device, comprising:
   providing a first application on the device;
   providing a second application on the headset;
   configuring the parameters of said headset using said first application and said second application, comprising:
      establishing a secure communication link by completing one or more challenge response interaction sequences between the headset and the device, using a currently prevailing personal identification number;
      generating an autonomous request from the headset to configure a new authentication personal identification number based on a pre-set timeout for said currently prevailing personal identification number;
      generating a new authentication personal identification number at the device based on one of a user input at the device and a user selection from a list of permitted personal identification numbers stored in the device;
      transmitting said new authentication personal identification number from said device to said headset for configuring the new authentication personal identification number at the headset, whereby said human machine interface of said device acts as an extended human machine interface of the headset, wherein said transmission occurs through said established secure communication link;

automatically enforcing reauthentication using said new authentication personal identification number; and transmitting new values of said configuration parameters from said device to said headset, wherein said transmission occurs through said established secure communication link.

9. A system for configuring an authentication personal identification number on a headset comprising:

a first application provided on a device, wherein said first application comprises a first personal identification number configuration module, configured to transmit a new authentication personal identification number from said device to said headset, wherein said first application generates a new authentication personal identification number at the device based on one of a user input at the device and a user selection from a list of permitted personal identification numbers stored in the device;

a second application provided on the headset, wherein said second application generates an autonomous request to configure a new authentication personal identification number based on a pre-set timeout for said currently prevailing personal identification number, wherein said second application comprises:

a personal identification number identifier module;

a second personal identification number configuration module for configuring the new authentication personal identification number at the headset; and a storage means, wherein said storage means stores permitted personal identification numbers and said new authentication personal identification number;

a first Bluetooth transceiver located within the device and a second Bluetooth transceiver located within the headset, wherein said first Bluetooth transceiver and said second Bluetooth transceiver transmit and receive Bluetooth packets between the headset and the device through a secure communication link, established by completing one or more challenge response interaction sequences.

10. The system of claim 9, wherein said personal identification number storage means contains a memory unit and memory access means.

11. The system of claim 9, wherein the device further comprises a memory unit for storing said personal identification number, and wherein said memory unit is accessed by a memory access means.

12. The system of claim 9, wherein in an attempt to establish a communication correspondence between the device and the headset, the user is required to input the unique personal identification number when prompted, wherein after authentication using the personal identification number, a communication correspondence is permitted between the device and the headset.

13. The system of claim 10, wherein the memory unit of the second application stores the user profiles, the headset information, a currently prevailing personal identification number, the timestamp at which the personal identification number was set, the details of the users permitted to change the personal identification number, and a list of all the permitted personal identification numbers.

14. The system of claim 9, further comprising a communication module that establishes an authenticated communication link, locks said authenticated communication link for the entire duration of the connection, warns the user if the headset moves out of the coverage range, and disconnects existing connection after lapse of the duration.

15. A computer program product comprising computer executable instructions embodied in a non-transitory computer-readable medium, said computer program product comprising:

a first computer parsable program code on a headset for conducting personal identification number identification and authentication procedures;

a second computer parsable program code on a device for conducting personal identification number identification and authentication procedures;

a third computer parsable program code for configuring said personal identification number access information on said headset, comprising:

a fourth computer parsable program code for establishing a secure communication link by completing challenge response interaction between the headset and the device, using the currently prevailing personal identification number;

a fifth computer parsable program code for generating an autonomous request from the headset to configure a new authentication personal identification number based on a pre-set timeout for said currently prevailing personal identification number;

a sixth computer parsable program code for generating a new authentication personal identification number at the device based on one of a user input at the device and a user selection from a list of permitted personal identification numbers stored in the device;

a seventh computer parsable program code for transmitting said new authentication personal identification number from said device to said headset for configuring the new authentication personal identification number at the headset, whereby said human machine of said device acts as an extended human machine interface of the headset, wherein said transmission occurs through an established secure communication link by completing challenge response interaction sequences between said headset and said device; and an eighth computer parsable program code for automatically enforcing reauthentication using said new authentication personal identification number.

16. The computer program product of claim 15, further comprising a ninth computer parsable program code for establishing and locking a communication link between the device and the headset, wherein said communication link is established using the new authentication personal identification number.

* * * * *